(12) United States Patent
Leigh et al.

(10) Patent No.: US 10,205,536 B2
(45) Date of Patent: Feb. 12, 2019

(54) MODULAR BACKPLANES

(71) Applicant: HEWLETT PACKARD ENTERPRISE DEVELOPMENT LP, Houston, TX (US)

(72) Inventors: Kevin B Leigh, Houston, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/472,479

(22) Filed: Mar. 29, 2017

(65) Prior Publication Data

US 2018/0287713 A1 Oct. 4, 2018

(51) Int. Cl.
| H04B 10/80 | (2013.01) |
| H04Q 11/00 | (2006.01) |
| H04B 10/40 | (2013.01) |
| H04B 10/50 | (2013.01) |
| H04B 10/60 | (2013.01) |

(52) U.S. Cl.
CPC ......... *H04B 10/801* (2013.01); *H04B 10/808* (2013.01); *H04Q 11/0071* (2013.01)

(58) Field of Classification Search
None
See application file for complete search history.

(56) References Cited

U.S. PATENT DOCUMENTS

| 6,147,863 A | * | 11/2000 | Moore | G06F 1/184 361/679.6 |
| 7,075,796 B1 | * | 7/2006 | Pritchett | G06F 1/184 211/41.17 |
| 2002/0021855 A1 | * | 2/2002 | Kim | G02B 6/43 385/15 |
| 2009/0067788 A1 | * | 3/2009 | Baker | G02B 6/4292 385/76 |

OTHER PUBLICATIONS

Yuval Bachar, Open19, open19-external-9-20-2016.pptx, 22 pages, www.open19.org.

* cited by examiner

*Primary Examiner* — Darren E Wolf
(74) *Attorney, Agent, or Firm* — Hewlett Packard Enterprise Patent Department

(57) ABSTRACT

An example modular backplane device that transforms signals is described. The example disclosed herein comprises a plurality of interface connectors evenly distributed on a first side of a housing of the modular backplane to transfer a plurality of first signals. The example further comprises one or more aggregation point connectors on an edge of the first side of the housing of the modular backplane to transfer data, transfer management information, and receive electrical power. The modular backplane device example also comprises a logic board coupled to the plurality of interface connectors and to the one or more aggregation point connectors. The logic board is to transform signals and comprises signal transformation logic and a management processor.

18 Claims, 14 Drawing Sheets

MODULAR BACKPLANES

BACKGROUND

A backplane is a group of connectors in parallel used as a backbone to connect several printed circuit boards together to make up a complete computer system. Backplanes may be offered as passive or active backplanes, depending on whether they offer no powered components or whether they include powered components, respectively.

BRIEF DESCRIPTION OF THE DRAWINGS

Figures of the present disclosure depict examples, implementations, and configurations of the invention, and not the invention itself. The drawing descriptions are as follows.

DETAILED DESCRIPTION

Figure 1:
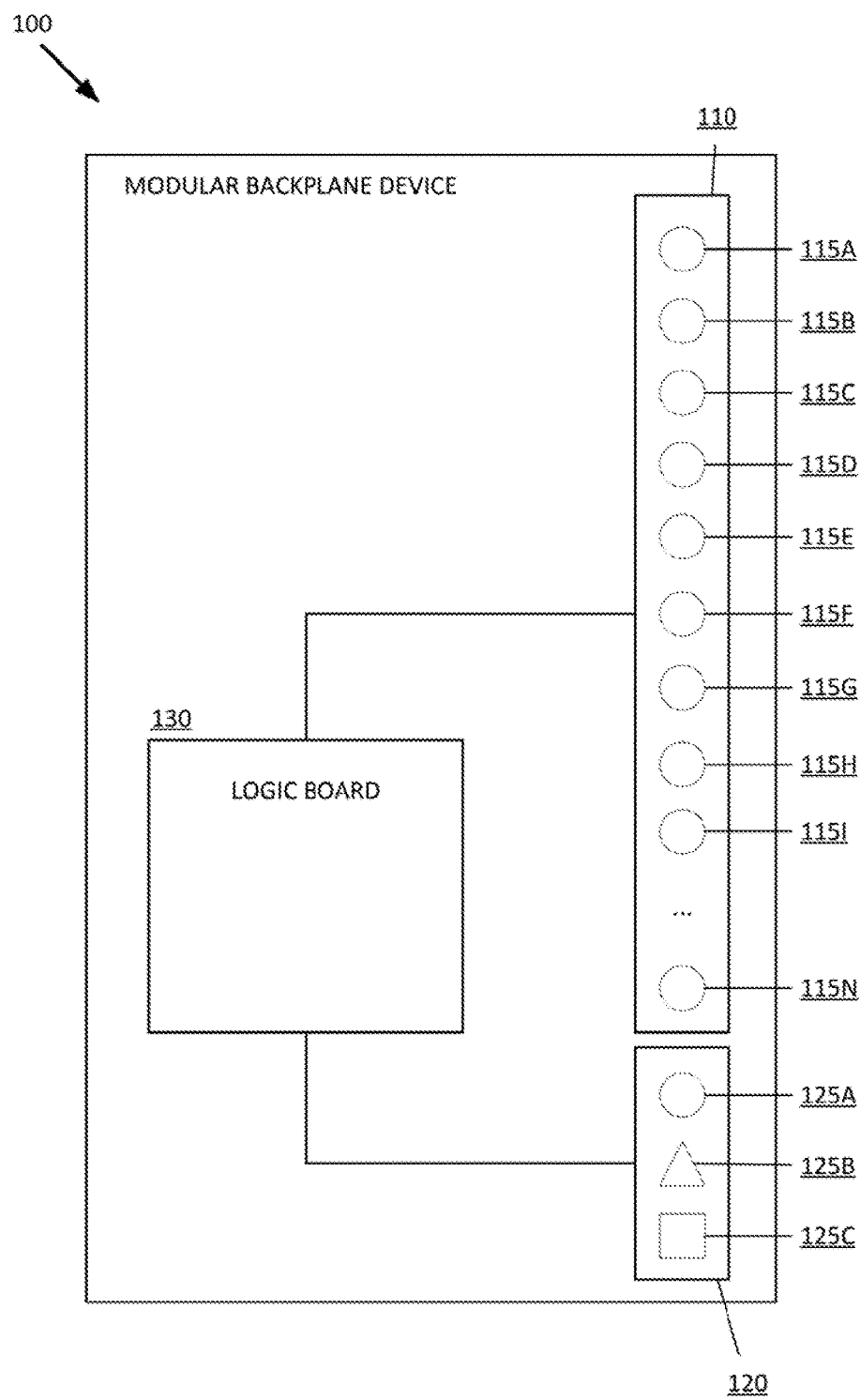
FIG. 1 is a block diagram illustrating a modular backplane device example for transforming signals via a logic board.

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

A backplane is a group of backplane connectors in parallel used as a backbone to connect several modules each with printed circuit board (PCB) together to make up a complete connected system. Backplanes may be offered as passive or active backplanes. Passive backplanes offer no powered components, hence any desired powered components such as bus drivers are placed on the module cards. The module cards are in the modules that are coupled directly to the backplane connectors. Active backplanes include powered components, e.g., chips which drive the various signals to the backplane connectors. In some examples, backplanes are used to connect modules with each other (e.g. servers in a rack) with a switch (e.g. a network switch in a rack). Modules (e.g. servers) may carry identification (ID) tags to identify themselves.

PCB backplanes may connect high-speed signals between multiple modular servers and switches within an enclosure via PCB traces. These PCB traces may be limited up to 0.5 m in length for high-speed signals such as 25 Gbps. Cable backplanes may connect high-speed signals between multiple modular servers and high-radix switches within a rack (e.g. less than 3 m signal paths). In the present disclosure, a rack may be understood as an assembly with a plurality of slots to fit a plurality of servers in the top part of the rack, a plurality of servers in the bottom part of the rack, and a switch in between the first and the second plurality. It is more difficult for enclosures with PCB backplanes to support high number of servers and data rate above 25 Gigabits per second (Gbps). Although cable terminated backplane connectors may be implemented for each server, aggregated connectors on switches introduce significant challenges including large volumetric, air flow blockage, electrical signal integrity to route traces within switches, high cost, cable weight causing connection reliability under environmental stress, among other physical and thermal challenges. The present disclosure may overcome the previous challenges by, for example, aggregating signal backplane cables from servers via a logic board that contains components to perform cable aggregation functions. Further advantages of the disclosed backplane may include a lower cost, a better cooling environment for switches, scalable bandwidth for different applications, ease of mounting, and fewer port count switches; without using any additional rack space.

In the present disclosure, examples may be understood as examples and not limiting the scope of the disclosure. For example, a server connected to the backplane may be interchanged for any similar modular device, referred hereinafter as module.

In some examples, a modular backplane device may comprise a plurality of interface connectors evenly distributed on a first side of a housing of the modular backplane to transfer a plurality of first signals. It may also comprise one or more aggregation point connectors that may be located on an edge of the first side of the housing of the modular backplane; that may be adapted to transfer data, transfer management information, and receive electrical power. The same example may also contain a logic board with a processor, the logic board connected to the plurality of interface connectors and to the one or more aggregation point connectors, to transform signals.

Referring now to the drawings, FIG. 1 is a block diagram illustrating a modular backplane device 100 example for transforming signals via a logic board. The backplane system comprises a first interface connector 115A, a second interface connector 115B, to an N interface connector 115N, wherein N is a positive integer; the N interface connectors are referred hereinafter as a plurality 110 of interface connectors. The system 100 example further comprises a first aggregation point connector 125A, a second aggregation point connector 125B, and a third aggregation point connector 125C; the collection of aggregation point connectors may be referred hereinafter as one or more aggregation point connectors 120. Even though the present example comprise three aggregation point connectors 125A-125C, the scope of the present disclosure may be understood broadly and may include from 1 to M aggregation point connectors, wherein M is a positive integer. The system 100 example further includes a logic board 130.

The plurality 110 of interface connectors are evenly distributed in the housing of the modular backplane. As an example, the plurality 110 of interface connectors may be aligned in the same side of the housing of the modular backplane 100. As another example, the housing of the modular backplane may be an elongated housing, wherein the plurality 110 of interface connectors may be installed along the length of the elongated housing. The plurality of interface connectors may be connected to a plurality of external modules (e.g. servers, storage modules, memory modules, or a combination thereof), therefore each interface connector 115A-115N is adapted to transfer a plurality of first signals from an external module. In the present disclosure, the term "to transfer" may be understood broadly as it includes both sending signals and receiving signals. The external module may be a server or any other modular device capable of transmitting electrical or optical signals. As another example, each the plurality of interface connectors may be connected to the same external module, then each of the plurality of interface connectors may be identical.

The one or more aggregation point connectors 120 may be connected to a switch. Examples from the present disclosure connect the one or more aggregation point connectors 120 to a switch, however, the one or more aggregation point connectors may be connected to any suitable switching or routing device. The one or more aggregation point connectors 120 are adapted to transfer data from the switch, the data transfer may be through electrical or optical signals. The one or more aggregation point connectors 120 may be further adapted to transfer management information. The one or more aggregation point connectors may be adapted to receive electrical power. As a first example, the modular backplane device 100 may include three aggregation point connectors: a first aggregation point connector 125A, a second aggregation point connector 125B, and a third aggregation point connector 125C. The first aggregation point connector 125A may be adapted to transfer data with the switch (e.g. electrical signals, optical signals), the second aggregation point connector 125B may be adapted to transfer management information with the switch (e.g., electrical signals, optical signals); and the third aggregation point connector 125C may be adapted to receive electrical power from the switch. As a second example, the modular backplane device 100 may include two aggregation point connectors: a first aggregation point connector 125A, and a second aggregation point connector 125B. The first aggregation point connector 125A may be adapted to transfer data with the switch (e.g. electrical signals, optical signals) and to receive electrical power from the switch, and the second aggregation point connector 125B may be adapted to transfer management information with the switch. As a third example, the modular backplane device 100 may include two aggregation point connectors: a first aggregation point connector 125A, and a second aggregation point connector 125B. The first aggregation point connector 125A may be adapted to transfer data with the switch (e.g. electrical signals, optical signals), and the second aggregation point connector 125B may be adapted to transfer management information with the switch and to receive electrical power from the switch. As a fourth example, the modular backplane device may include one aggregation point connector 125A adapted to transfer data with the switch (e.g. electrical signals, optical signals), to transfer management information with the switch, and to receive electrical power from the switch.

The plurality 110 of interface connectors are connected to the logic board 130. In one example, the plurality 110 of interface connectors may connect to the logic board 130 by using electrical cables. In another example, the plurality 110 of interface connectors may connect to the logic board 130 by using optical cables. The one or more aggregation point connectors 120 are also connected to the logic board 130. In one example, the aggregation point connectors 120 may connect to the logic board 130 by using electrical and/or optical cables. In another example, the aggregation point connectors 120 may be mounted on the logic board 130. The logic board 130 includes a management processor to transform signals. In the present disclosure, management information may be understood as the commands from the switch that need to be interpreted by the management processor to detect and collate the ID tags from the modules, and to configure any necessary electrical or optical signal interface parameters (e.g. query for status information, turning module ports on/off, configuring electrical high-speed signal parameters such as drive strength controls, signal shaping, turning indicators on/off), and to control data flow rates between modules and the switch. The one or more aggregation point connectors 120 may receive electrical power to transfer it to the active devices of the logic board to operate (e.g. controller chip, signal conversion chip, LED, ID reader, etc.).

FIG. 2A-2D are block diagram examples of a logic board. The logic board of FIG. 2A-2D may be the same or similar to the logic board 130 of FIG. 1.

Figure 2A:
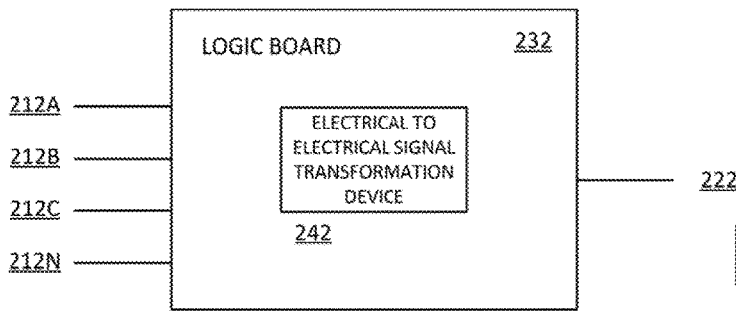
FIG. 2A is a block diagram illustrating a logic board example for transforming an electrical signal to electrical signal.

FIG. 2A illustrates a block diagram illustrating a logic board 232 example for transforming an electrical signal to electrical signal. The logic board 232 includes an electrical to electrical signal transformation device 242 that transforms a received electrical signal to an electrical signal. As a first example of logic board configuration, the logic board 232 may receive a plurality of electrical signal inputs 212A-212N to be transformed to an electrical output 222. As a second example of logic board configuration, the logic board 232 may receive an electrical input 222 to be transformed to a plurality of electrical signal outputs 212A-212N. As a first example of signal transformation, the logic board 232 may be used as a gearbox that transforms 12×10 G electrical (12×10 G means 10 Gbps/lane and one lane for each 12 module=120 Gbps) to 4×25 G electrical. As a second example of signal transformation, the logic board may be used as a switch that transforms 12×25 G electrical to 4×25 G electrical. As an example, the electrical to electrical signal transformation device 242 in the logic board 232 may also contain logic to regulate the data flow from the modules to not exceed the maximum data rate that the switch can receive (e.g. 100 Gbps aggregate bandwidth). An example method to regulate the data flow from the modules is for the switch port to send PAUSE frames to the network interface ports of the modules via the logic board 232, per the IEEE 802.1Qbb Priority Flow Control (PFC) industry standard specification.

Figure 2B:
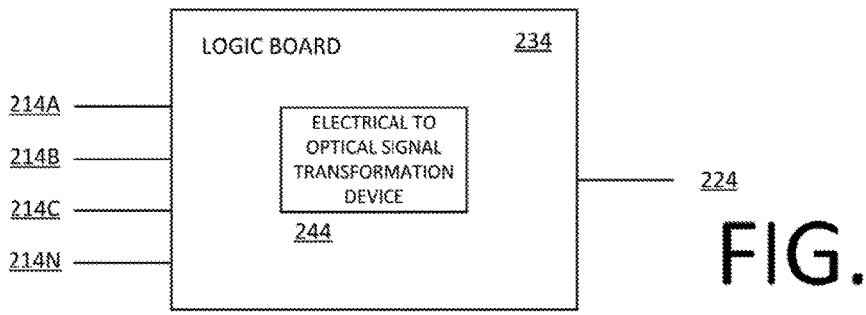
FIG. 2B is a block diagram illustrating a logic board example for transforming an electrical signal to optical signal.

FIG. 2B illustrates a block diagram illustrating a logic board 234 example for transforming an electrical signal to optical signal. The logic board 234 includes an electrical to optical signal transformation device 244 that transforms a received electrical signal to an optical signal. As a first example of logic board configuration, the logic board 234 may receive a plurality of electrical signal inputs 214A-214N to be transformed to an optical output 224. As a second example of logic board configuration, the logic board 234 may receive an optical input 224 to be transformed to a plurality of electrical signal outputs 214A-214N. As a first example of signal transformation, the logic board 234 may be used as an E/O converter that transforms 24×25 G electrical to 24×25 G optical. As a second example of signal transformation, the logic board may be used as a gearbox and E/O converter that transforms 24×25 G electrical to 12×50 G optical.

Figure 2C:
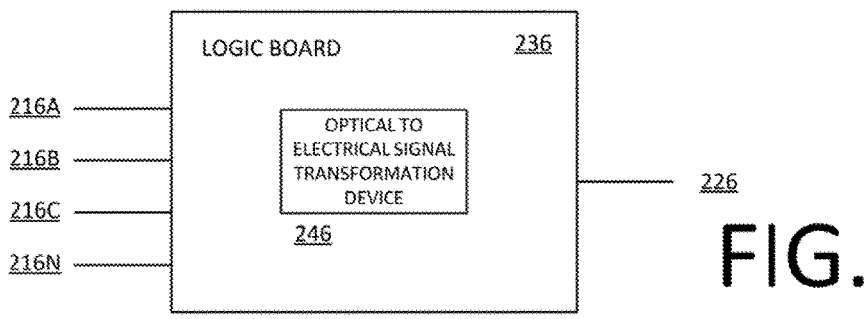
FIG. 2C is a block diagram illustrating a logic board example for transforming an optical signal to electrical signal.

FIG. 2C illustrates a block diagram illustrating a logic board 236 example for transforming an optical signal to electrical signal. The logic board 236 includes an optical to electrical signal transformation device 246 that transforms a received optical signal to an electrical signal. As a first example of logic board configuration, the logic board 236 may receive a plurality of optical signal inputs 216A-216N to be transformed to an electrical output 226. As a second example of logic board configuration, the logic board 236 may receive an optical input 226 to be transformed to a plurality of electrical signal outputs 216A-216N.

Figure 2D:
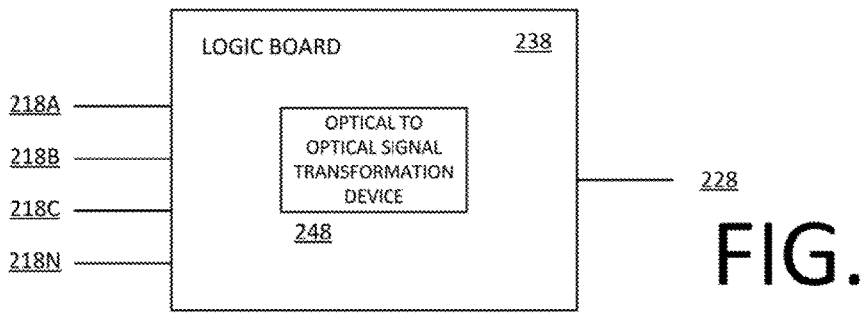
FIG. 2D is a block diagram illustrating a logic board example for transforming an optical signal to optical signal.

FIG. 2D illustrates a block diagram illustrating a logic board 238 example for transforming an optical signal to optical signal. The logic board 238 includes an optical to optical signal transformation device 248 that transforms a received optical signal to an optical signal. As a first example of logic board configuration, the logic board 238 may receive a plurality of optical signal inputs 218A-218N to be transformed to an optical output 228. As a second example of logic board configuration, the logic board 238 may receive an optical input 228 to be transformed to a plurality of optical signal outputs 218A-218N.

Figure 3:
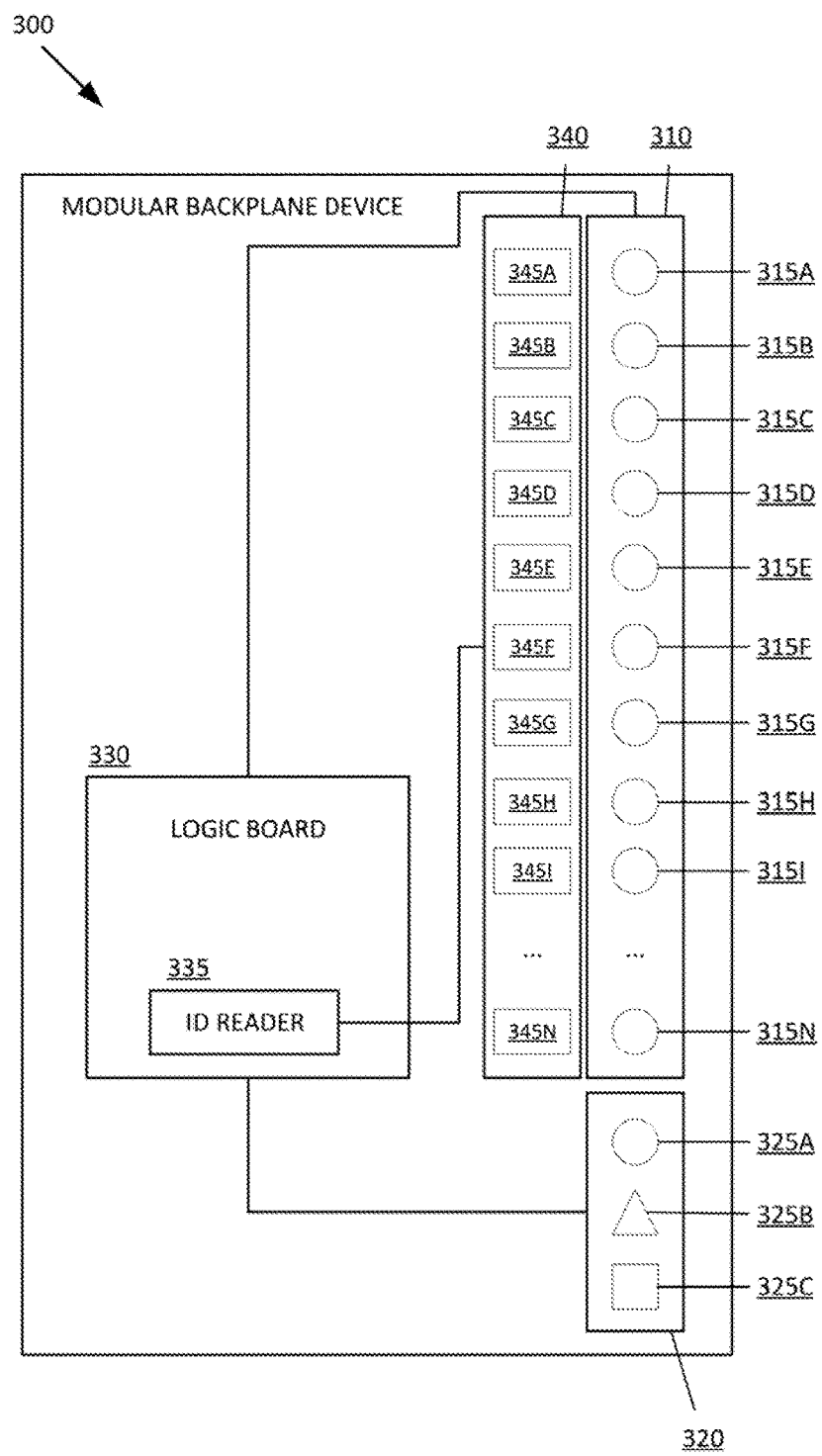
FIG. 3 is a block diagram illustrating a modular backplane device example for transforming signals via a logic board with a plurality of interface connectors and an ID reader.

FIG. 3 illustrates a block diagram illustrating a modular backplane device 300 example for transforming signals via a logic board with a plurality of interface connectors and an identification (ID) reader. The modular backplane device 300 comprises a first interface connector 315A, a second interface connector 315B, to a N interface connector 315N, wherein N is a positive integer; the N interface connectors are referred hereinafter as a plurality 310 of interface connectors. The plurality 310 of interface connectors may be similar or the same as the plurality 110 of interface connectors of FIG. 1. The system 300 example further comprises a first aggregation point connector 325A, a second aggregation point connector 325B, and a third aggregation point connector 325C; the collection of aggregation point connectors may be referred hereinafter as one or more aggregation point connectors 320. Even though the present example comprise three aggregation point connectors 325A-325C, the scope of the present disclosure may be understood broadly and may include from 1 to M aggregation point connectors, wherein M is a positive integer. The one or more aggregation point connectors 320 may be similar or the same as the one or more aggregation point connectors 120 of FIG. 1. The system 300 example includes a logic board 330. The logic board 330 may be similar or the same as the logic board 130 of FIG. 1. The modular backplane device 300 further comprises a first sensing antenna 345A, a second sensing antenna 345B, to a N sensing antenna 345N, wherein N is a positive integer; the N sensing antennas are referred hereinafter as a plurality of sensing antennas 340. Each antenna 345A-345N from the plurality of sensing antennas 340 may be positioned in close proximity to each of the interface connectors 315A-315N from the plurality of interface connectors (e.g. sensing antenna 345A may be positioned in close proximity to interface connector 315A, sensing antenna 345B may be positioned in close proximity to interface connector 315B, and sensing antenna 345N may be positioned in close proximity to interface connector 315N). The plurality of sensing antennas 340 may be connected to an ID reader 335 located in the logic board 330. In one example, the plurality of sensing antennas 340 may be electrically coupled to an ID reader 335. In another example, the plurality of sensing antennas 340 may be implemented on the logic board 330. The plurality of sensing antennas 340 are sensors of the plurality 310 of interface connectors that may detect the modules (e.g. servers, storage modules, memory modules, or a combination thereof) ID tags and identify module connector types and other module information (e.g. high-speed signal properties including signal type, bandwidth, etc.)

Figure 4:
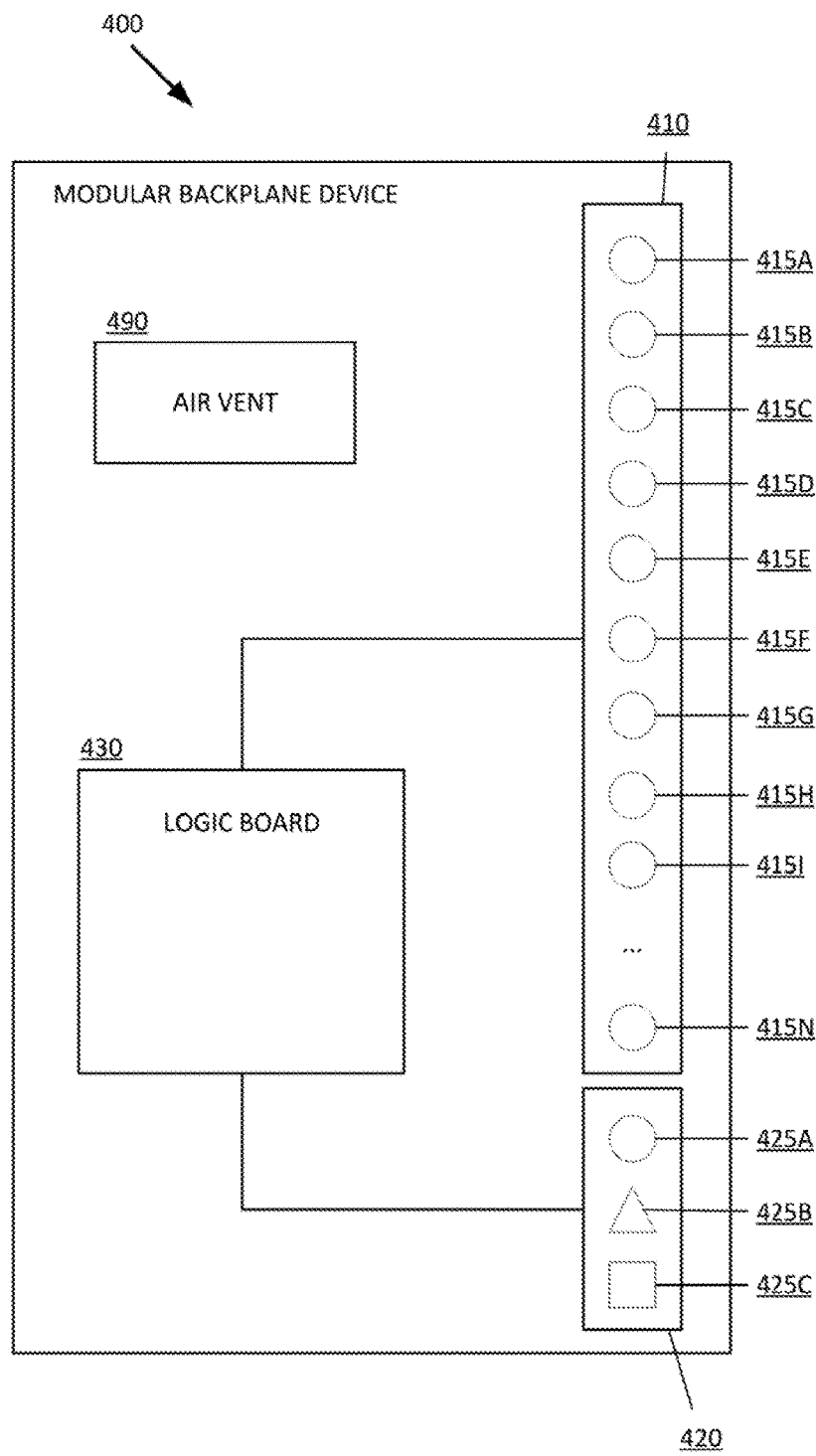
FIG. 4 is a block diagram illustrating a modular backplane device example for transforming signals via a logic board with an air vent.

FIG. 4 illustrates a block diagram illustrating a modular backplane device 400 example for transforming signals via a logic board with an air vent. The modular backplane device 400 comprises a first interface connector 415A, a second interface connector 415B, to a N interface connector 415N, wherein N is a positive integer; the N interface connectors are referred hereinafter as a plurality 410 of interface connectors. The plurality 410 of interface connectors may be similar or the same as the plurality 110 of interface connectors of FIG. 1. The system 400 example further comprises a first aggregation point connector 425A, a second aggregation point connector 425B, and a third aggregation point connector 425C; the collection of aggregation point connectors may be referred hereinafter as one or more aggregation point connectors 420. Even though the present example comprise three aggregation point connectors 425A-425C, the scope of the present disclosure may be understood broadly and may include from 1 to M aggregation point connectors, wherein M is a positive integer. The one or more aggregation point connectors 420 may be similar or the same as the one or more aggregation point connectors 120 of FIG. 1. The system 400 example includes a logic board 430. The logic board 430 may be similar or the same as the logic board 130 of FIG. 1. The system 400 further includes an air vent 490.

The air vent 490 may act as a cooling system of the circuitry of the modular backplane device 400. The system 400, for example, may comprise an air inlet vent located on an edge of an elongated modular backplane device 400 and an air exhaust vent on the opposite edge of the elongated modular backplane device 400. In the previous configuration, lower temperature air may enter in the air inlet vent, then the lower temperature air may flow through the backplane raising its temperature due to heat interchange with the inner circuitry and the logic board. Due to the exothermic nature of the inner circuitry and the logic board, they may transfer heat to the air, therefore cooling themselves down. As another example, a fan may be introduced on the same side as the inlet vent, therefore enhancing the cooling system described in the previous example.

Figure 5A:
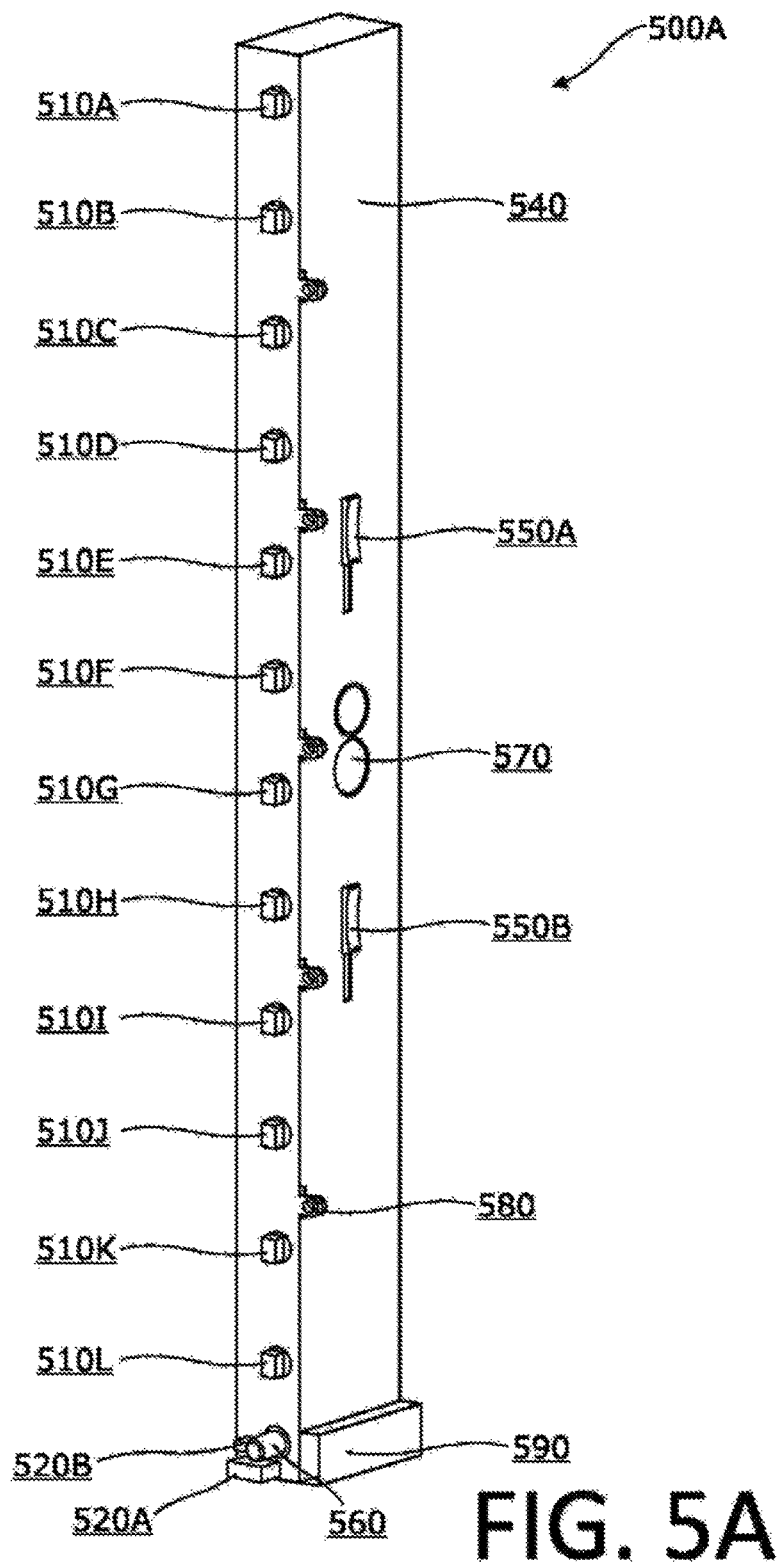
FIG. 5A is a schematic diagram illustrating the outside housing of a modular backplane device example for transforming signals via a logic board.
Figure 5B:
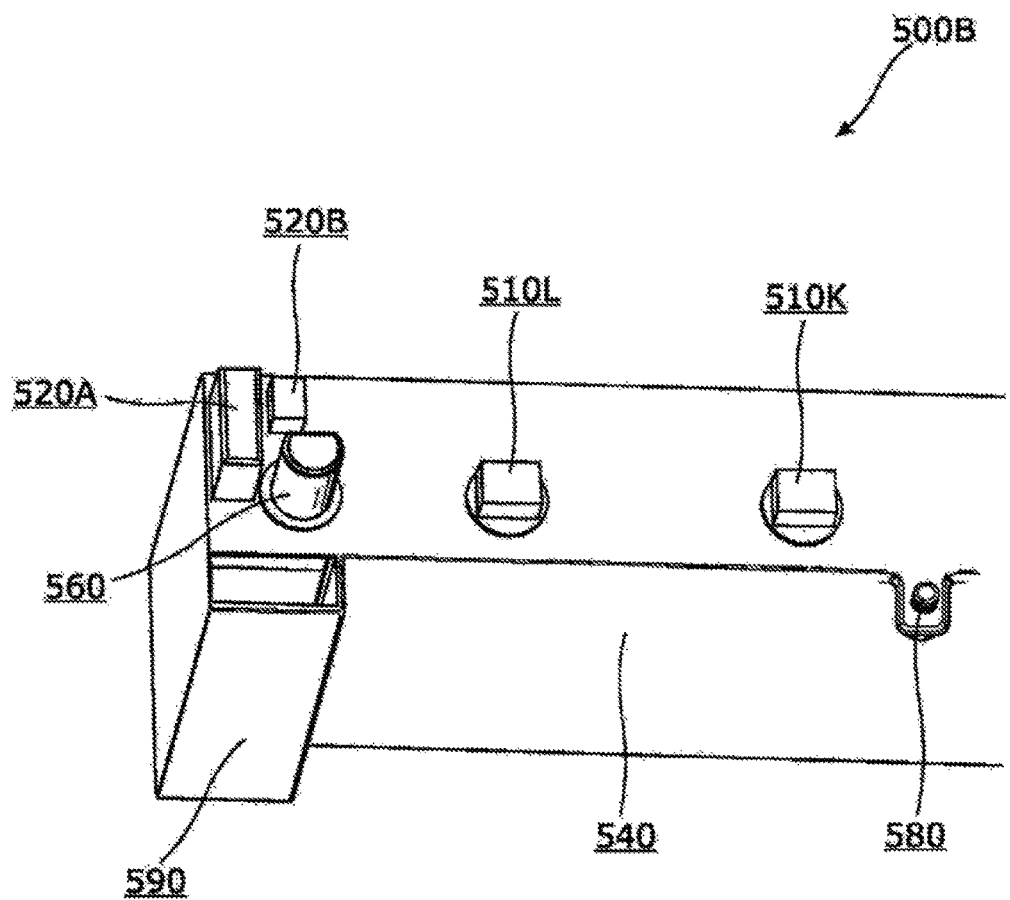
FIG. 5B is a schematic diagram illustrating the outside housing of a modular backplane device example for transforming signals via a logic board.
Figure 5C:
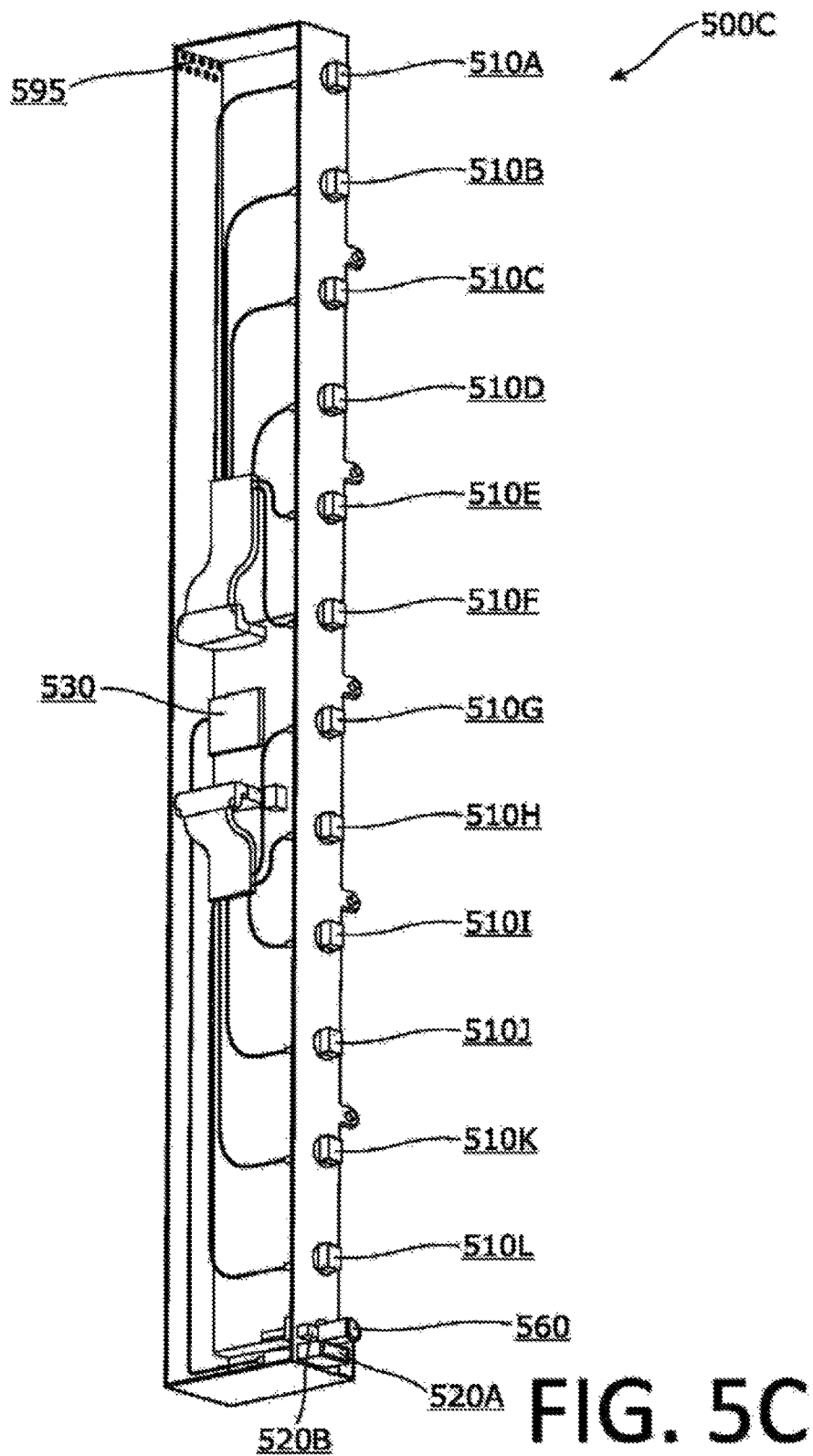
FIG. 5C is a schematic diagram illustrating the inside housing of a modular backplane device example for transforming signals via a logic board.

FIG. 5A-5C illustrate a schematic diagram of a modular backplane example.

FIG. 5A illustrates a schematic diagram illustrating the outside housing of a modular backplane device 500A example for transforming signals via a logic board. The components in system 500A may be similar or the same as the components disclosed in FIG. 1-4. The modular backplane device 500A may have a housing 540 to protect the inner components shown in FIG. 5C. A plurality 510A-510L of interface connectors may be found evenly distributed on the same single side of the housing 540 of the system 500A. On the same side of the plurality 510A-510L of interface connectors may be found one or more aggregation point connectors, for example, aggregation point connector 520A and aggregation point connector 520B. The system 500A housing 540 may comprise an air vent 590 (e.g. air inlet vent) and some mechanical orientation change features to change the modular backplane configuration, explained in more detail in FIG. 9. Some mechanical orientation change features examples may be selected from a plurality of retention screws 580, slide buttons 550A-550B, slide gear track, connector gear, orientation indicator insignia 570, a rotating key feature 560, or a combination thereof.

FIG. 5B illustrates a schematic diagram illustrating the outside housing of a modular backplane device 500B example for transforming signals via a logic board. The components in system 500B may be similar or the same as the components disclosed in FIG. 1-4. The system 500B may include a housing 540. The system 500B may include on one side a plurality 510A-510L of interface connectors (only 510K and 510L are shown in FIG. 5B) aligned and evenly distributed, and one or more aggregation point connectors 520A-520B on the same side of the housing 540. The housing 540 may also comprise an air vent 590 (e.g. air inlet vent). System 500B may comprise some mechanical orientation change features to change the modular backplane configuration, explained in more detail in FIG. 9. Some mechanical orientation change features examples may be a plurality of retention screws 580, and a rotating key feature 560.

FIG. 5C illustrates a schematic diagram illustrating the inside of the housing of a modular backplane device 500C example for transforming signals via a logic board. The components in system 500C may be similar or the same as the components disclosed in FIG. 1-4. The system 500C may show the components inside the housing 540 from FIG. 5A-5B. A plurality 510A-510L of interface connectors may be found evenly distributed on the same single side of the housing of the system 500C. On the same side of the plurality 510A-510L of interface connectors may be found one or more aggregation point connectors, for example, aggregation point connector 520A and aggregation point connector 520B. The system 500C housing may comprise an air vent 595 (e.g. air inlet vent) and some mechanical orientation change features (e.g. slide buttons 550A-550B) to change the modular backplane configuration, explained in more detail in FIG. 9. The plurality 510A-510L of interface connectors may be connected to the logic board 530. The one or more aggregation point connectors 520A-520B may be also connected to the logic board 530 to transform signals. The housing 540 may have an air inlet vent and an air exhaust vent 595.

Figure 6:
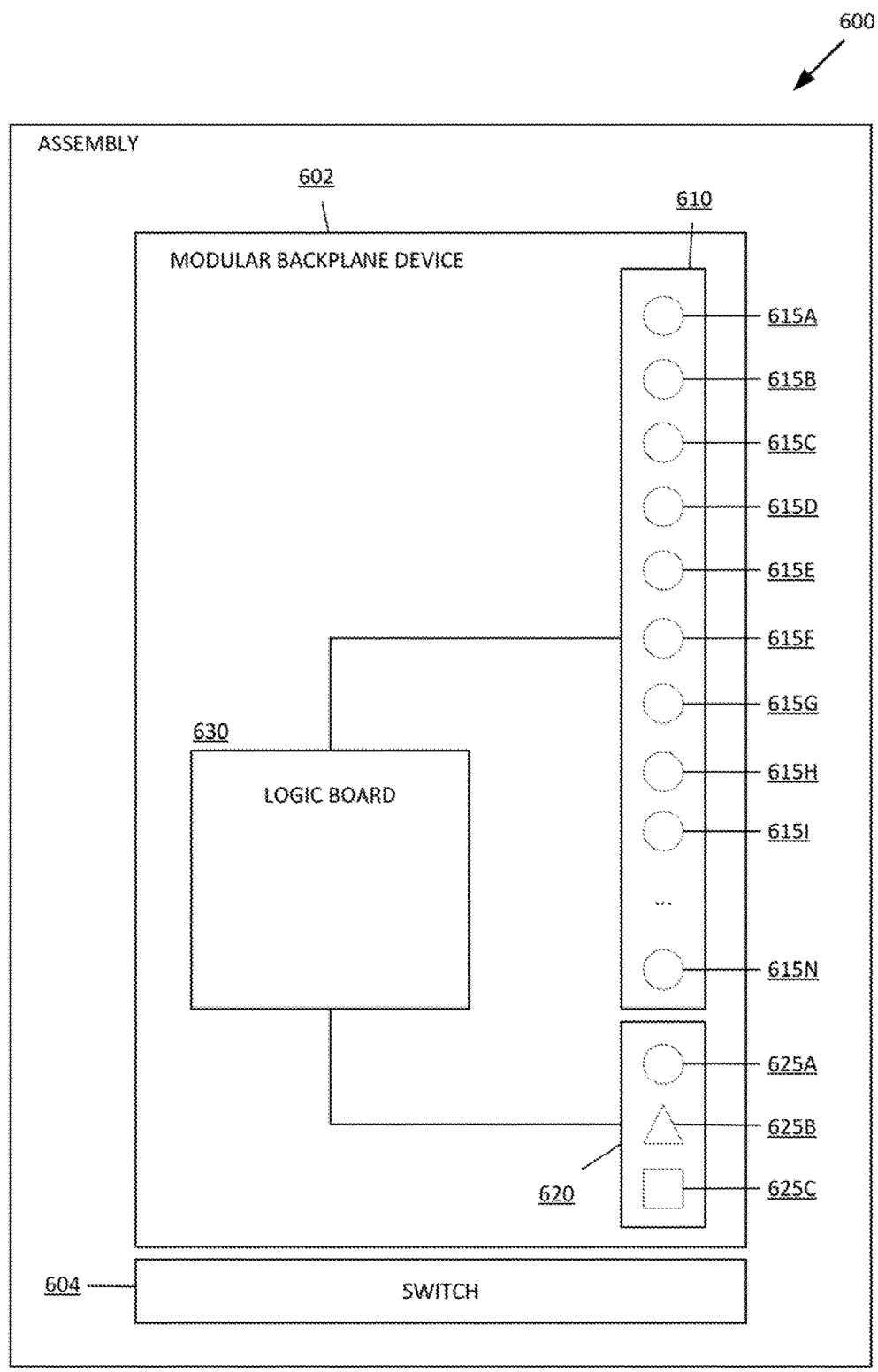
FIG. 6 is a block diagram illustrating an assembly example with a modular backplane device and a switch.

FIG. 6 illustrates a block diagram illustrating an assembly 600 example with a modular backplane device and a switch. The assembly 600 comprises a modular backplane device 602 and a switch 604. The modular backplane device 600 comprises a first interface connector 615A, a second interface connector 615B, to a N interface connector 615N, wherein N is a positive integer; the N interface connectors are referred hereinafter as a plurality 610 of interface connectors. The plurality 610 of interface connectors may be similar or the same as the plurality 110 of interface connectors of FIG. 1. The system 600 example further comprises a first aggregation point connector 625A, a second aggregation point connector 625B, and a third aggregation point connector 625C; the collection of aggregation point connectors may be referred hereinafter as one or more aggregation point connectors 620. Even though the present example comprise three aggregation point connectors 625A-625C, the scope of the present disclosure may be understood broadly and may include from 1 to M aggregation point connectors, wherein M is a positive integer. The one or more aggregation point connectors 620 may be similar or the same as the one or more aggregation point connectors 120 of FIG. 1. At least one of the aggregation point connectors from the modular backplane device 602 (e.g. aggregation point connector 625A) may be connected to the switch 604. The system 600 example includes a logic board 630. The logic board 630 may be similar or the same as the logic board 130 of FIG. 1.

Figure 7:
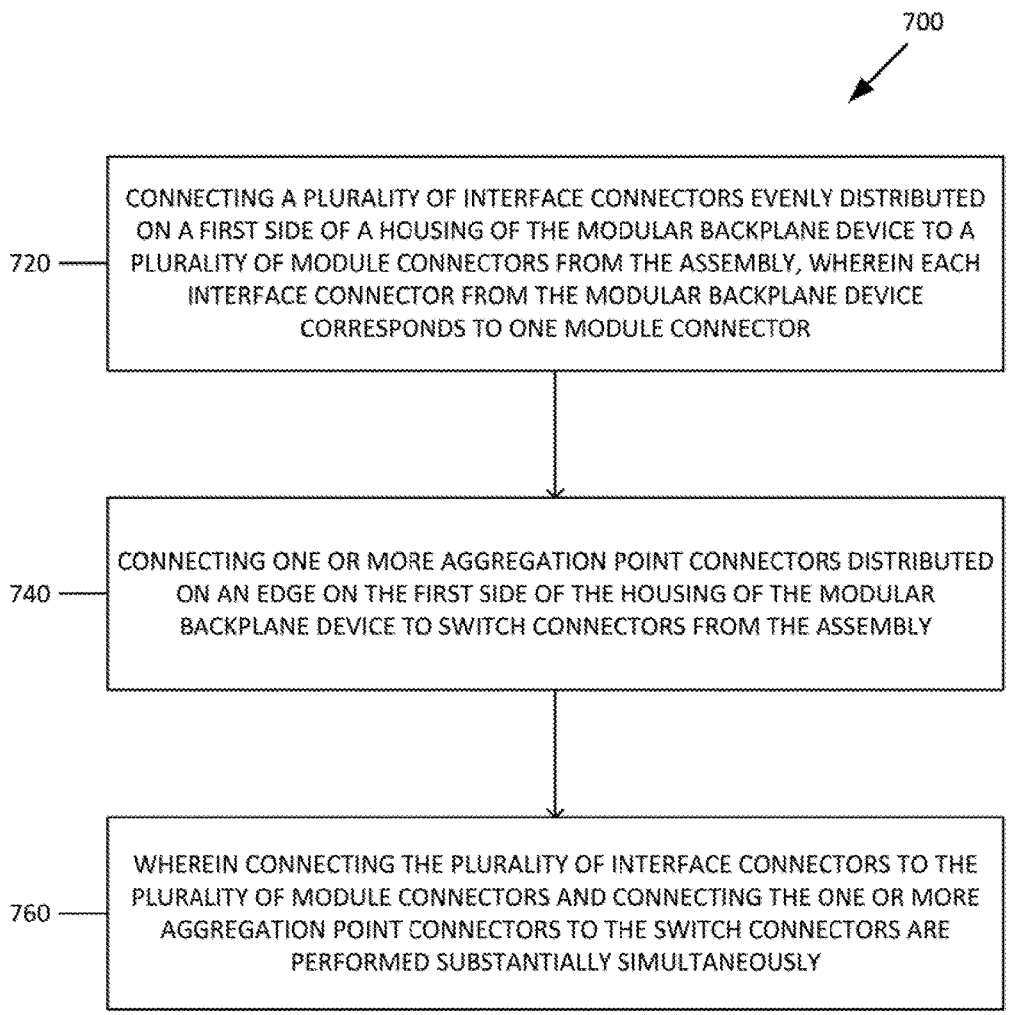
FIG. 7 is a flow chart of an example method to install a modular backplane device on an assembly.

FIG. 7 is a flow chart illustrating a method example 700 to install a modular backplane device on an assembly. Method 700 may be installed, for example, by device 100 from FIG. 1 or to install the assembly 600 from FIG. 6. The assembly installed by method 700 may comprise a plurality of modules evenly distributed and a switch. Each module comprises at least one module connector and the switch comprises at least one switch connector. The switch connector may be fixed switch connector or a rotatable switch connector. Each module connector may be adapted to transfer either an electrical or optical signal. The switch connector may be adapted to transfer either electrical or optical signal.

At block 720, the method 700 connects a plurality of interface connectors evenly distributed on a first side of a housing of the modular backplane device to a plurality of module connectors from the assembly, wherein each interface connector from the modular backplane device corresponds to one of the module connectors.

At block 740, the method 700 may connect one or more aggregation point connectors distributed on an edge on the first side of the housing of the modular backplane device to switch connectors from the assembly.

Method 700 may the connection of the plurality of interface connectors to the plurality of module connectors and the connection of the one or more aggregation point connectors to the switch connectors are performed substantially simultaneously. In the present disclosure, the term simultaneously may be understood broadly, therefore connecting the assembly modules and switch to the modular backplane device in the same spot time or within a little difference of time (e.g. less than 5 seconds).

Existing PCB backplanes may have serviceability, signal speed limitation, and air flow blockage challenges. A PCB backplane is a board that comprises a group of electrical connectors in parallel. Each of the electrical connectors is coupled with an electronic module when the electronic module is installed. An electronic connector may be damaged when an electronic module is installed. A legacy backplane is fixed within a chassis assembly and is not serviceable when electrical connectors are damaged (i.e. not replaceable without disassembling the entire chassis assembly). In addition, PCB backplanes commonly use printed circuit boards, which may limit signal speed especially for longer reach (e.g. <0.5 m for 25 Gbps signals). Furthermore, existing PCB backplanes use electrical aggregation points which, not only require a larger volumetric space since they are longer, which inquires higher cost, but also incur airflow blockage. Other backplane devices, such as cable backplanes, may be modular. However, cable backplanes aggregation point challenges are the same as PCB backplanes.

The herein disclosed backplane device (e.g. backplane device 100 from FIG. 1) may overcome the previous PCB and cable backplanes challenges. The disclosed modular backplane device comprise cable terminated connectors which allow lower loss signal paths enabling higher speed network data rates (e.g. 25 G/lane, 50 G/lane, 100 G/lane) to be connected via longer distances, this feature may overcome the limited high speed signal challenge from existing backplanes. As a first example, using an optical connector for an aggregation point connector (e.g. aggregation point connector 125A from FIG. 1), significantly reduces the volumetric and the airflow blockage. As a second example, a rigid assembly (e.g. assembly 600 from FIG. 6) wherein modules are stacked in parallel planes may be connected to a switch, wherein each of the module connectors are equally distributed, the backplane device may connect the switch connector to the plurality of module connectors simultaneously, therefore solving the serviceability challenge from PCB backplanes. As a third example, a module needs to be interchanged, then the backplane device is disconnected, the module is removed and the backplane is connected again, therefore no circuitry needs to be removed nor connected, avoiding the drawbacks of serviceability in existing PCB backplanes. Furthermore, since the backplane device is covered by a housing, the inner circuitry is protected and may not abrade as easily as in legacy backplanes. As a fourth example, using a rotatable module backplane connectors may allow the use of the same modular backplane device with different orientations within the same assembly (e.g. first physical orientation to a second physical orientation, further disclosed in FIG. 8A-8C). As a fifth example, the modular backplane device (e.g. modular backplane device 100 from FIG. 1) does not limit the module connectors to be electrical or optical.

Figure 8A:
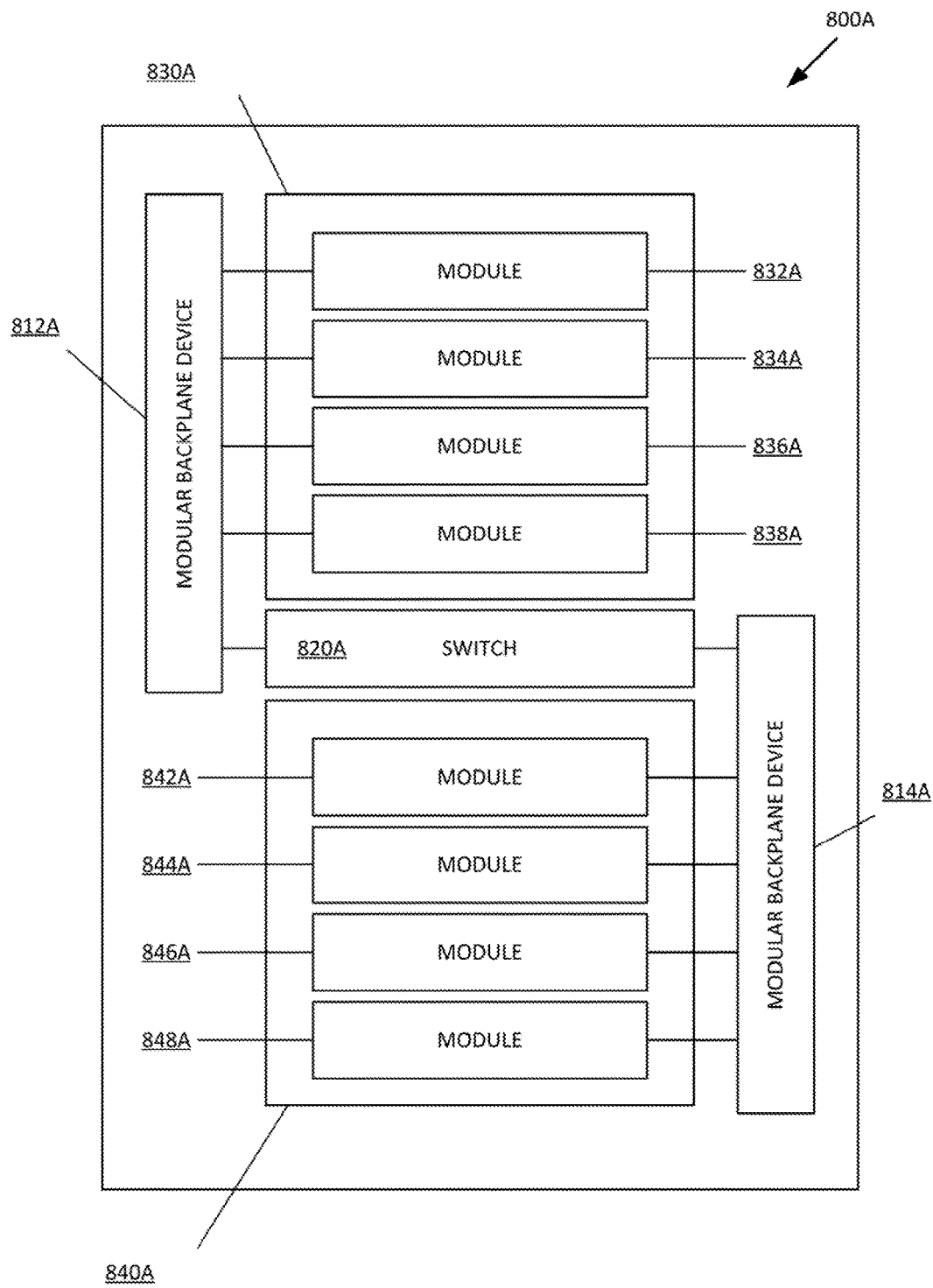
FIG. 8A is a block diagram illustrating an assembly example with modular backplanes devices, modules and a switch.
Figure 8B:
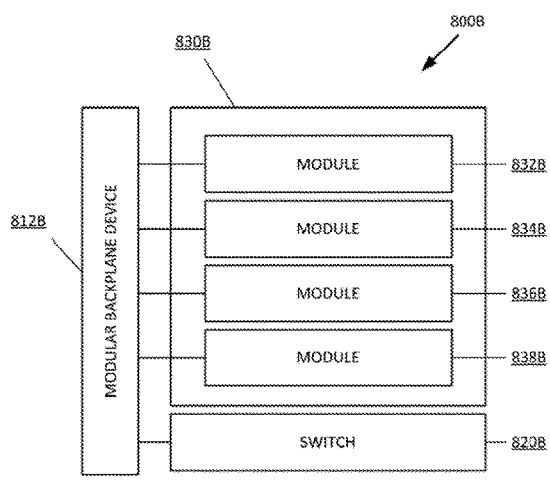
FIG. 8B is a block diagram illustrating an assembly example with a modular backplane device, modules and a switch.
Figure 8C:
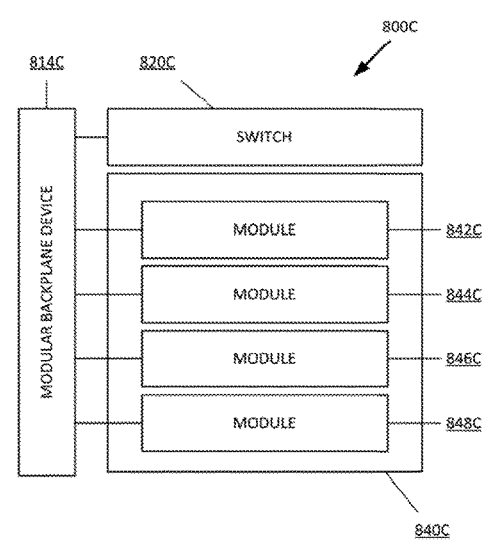
FIG. 8C is a block diagram illustrating an assembly example with a modular backplane device, modules and a switch.

FIG. 8A-8C illustrate a block diagram of an assembly example.

FIG. 8A illustrates a block diagram illustrating an assembly 800A example with modular backplanes devices, modules and a switch. The assembly 800A may be the same or similar to assembly 600 of FIG. 6. Method 700 for installing a modular backplane device on an assembly, may be used on the assembly 800A.

The assembly 800A comprises two modular backplane devices 812A and 814A, a plurality of modules 832A-838A and 842A-848A (e.g. servers, storage modules, memory modules, or a combination thereof) and a switch 820A. The modules 832A-838A and 842A-848A may be installed in the assembly 800A one onto another. The modules 832A-838A and 842A-848A may be independently serviceable. Each of the elongated sections of the modular backplane devices 812A and 814A may span a distance shorter than the full height of the assembly 800A. The modules are split into two groups separated by the switch 820A. There may be a first module group 830A in a first part of the assembly (e.g. modules 832A-838A in the top part of the assembly 800A), and there may be a second module group 840A in a second part of the assembly (e.g. modules 842A-848A in the bottom part of the assembly 800A). The first module group 830A and the second module group 840A may be separated by the switch 820A. The module groups (e.g. first module group 830A, second module group 840A) may have a different number of modules. The assembly 800A may comprise a modular backplane device 812A (e.g. modular backplane device 100 from FIG. 1) to connect the first module group 830A and the switch 820A though the elongated section of the modular backplane device. The assembly 800A may further comprise a modular backplane device 814A (e.g. modular backplane device 100 from FIG. 1) to connect the second module group 840A and the switch 820A though the elongated section of the modular backplane device. Following the previous configuration, the modular backplane device 812A may be in a first physical orientation as it connects the first module group 830A with the switch 820A, and the modular backplane device 814A may in a second physical orientation as it connects the second module group 840A with the switch 820A.

FIG. 8B illustrates a block diagram illustrating an assembly 800B example with a modular backplane device, modules and a switch. The assembly 800B may be the same or similar to assembly 600 of FIG. 6. Method 700 for installing a modular backplane device on an assembly, may be used to install the assembly 800B.

The assembly 800B comprises a modular backplane device 812B, a plurality of modules 832B-838B (e.g. servers, storage modules, memory modules, or a combination thereof) and a switch 820B. The modules 832B-838B may be installed in the assembly 880B one onto another. The modules 832B-838B may be independently serviceable. The switch 820B may be installed on the bottom of the modules 832B-838B. The elongated section of the modular backplane device 812B may span a distance shorter than the full height of the assembly 800B. The modules are grouped into a first module group 830B (e.g. in the top part of the assembly). In the present example, the first module group 830B comprises four modules 832B-838B, however, it may comprise a different amount of modules. The assembly 800B may comprise a modular backplane device 812B (e.g. modular backplane device 100 from FIG. 1) to connect the first module group 830B and the switch 820B. Following the previous configuration, the modular backplane device 812B may be in a first physical orientation as it connects the first module group 830B with the switch 820A. The first physical orientation of the modular backplane device 812B may be understood as the orientation of the modular backplane device that connects a plurality of modules (e.g. 832B-838B) with the switch (e.g. 820B), wherein the switch is installed in the bottom part of the plurality of modules. The plurality of modules and the switch may be installed one on top of the other in an assembly. In the first physical orientation, the modular backplane device connects with the modules and the switch on its elongated part, the modular backplane device is connected to the modules in the top part of the elongated section, and connects to the switch in the bottom part of the elongated section.

FIG. 8C illustrates a block diagram illustrating an assembly 800C example with a modular backplane device, modules and a switch. The assembly 800C may be the same or similar to assembly 600 of FIG. 6. Method 700 for installing a modular backplane device on an assembly, may be used to install the assembly 800C.

The assembly 800C comprises a modular backplane device 814C, a plurality of modules 842C-848C (e.g. servers, storage modules, memory modules, or a combination thereof) and a switch 820C. The modules 842C-848C may be installed in the assembly 800C one onto another. The modules 842C-842C may be independently serviceable. The switch 820C may be installed on top of the modules 842C-848C. The elongated section of the modular backplane device 814C may span a distance shorter than the full height of the assembly 800C. The modules are grouped into a second module group 840C (e.g. in the bottom part of the assembly). In the present example, the second module group 840C comprises four modules 842C-848C, however, it may comprise a different amount of modules. The assembly 800C may comprise a modular backplane device 814C (e.g. modular backplane device 100 from FIG. 1) to connect the second module group 840C and the switch 820C. Following the previous configuration, the modular backplane device 814C may be in a second physical orientation as it connects the first module group 840C with the switch 820C. The second physical orientation of the modular backplane device 814C may be understood as the orientation of the modular backplane device that connects a plurality of modules (e.g. 842C-848C) with the switch (e.g. 820C), wherein the switch is installed in the top part of the plurality of modules. The plurality of modules and the switch may be installed one on top of the other in an assembly. In the first physical orientation, the modular backplane device connects with the modules and the switch on its elongated part, the modular backplane device is connected to the modules in the bottom part of the elongated section, and connects to the switch in the top part of the elongated section.

Figure 9A:
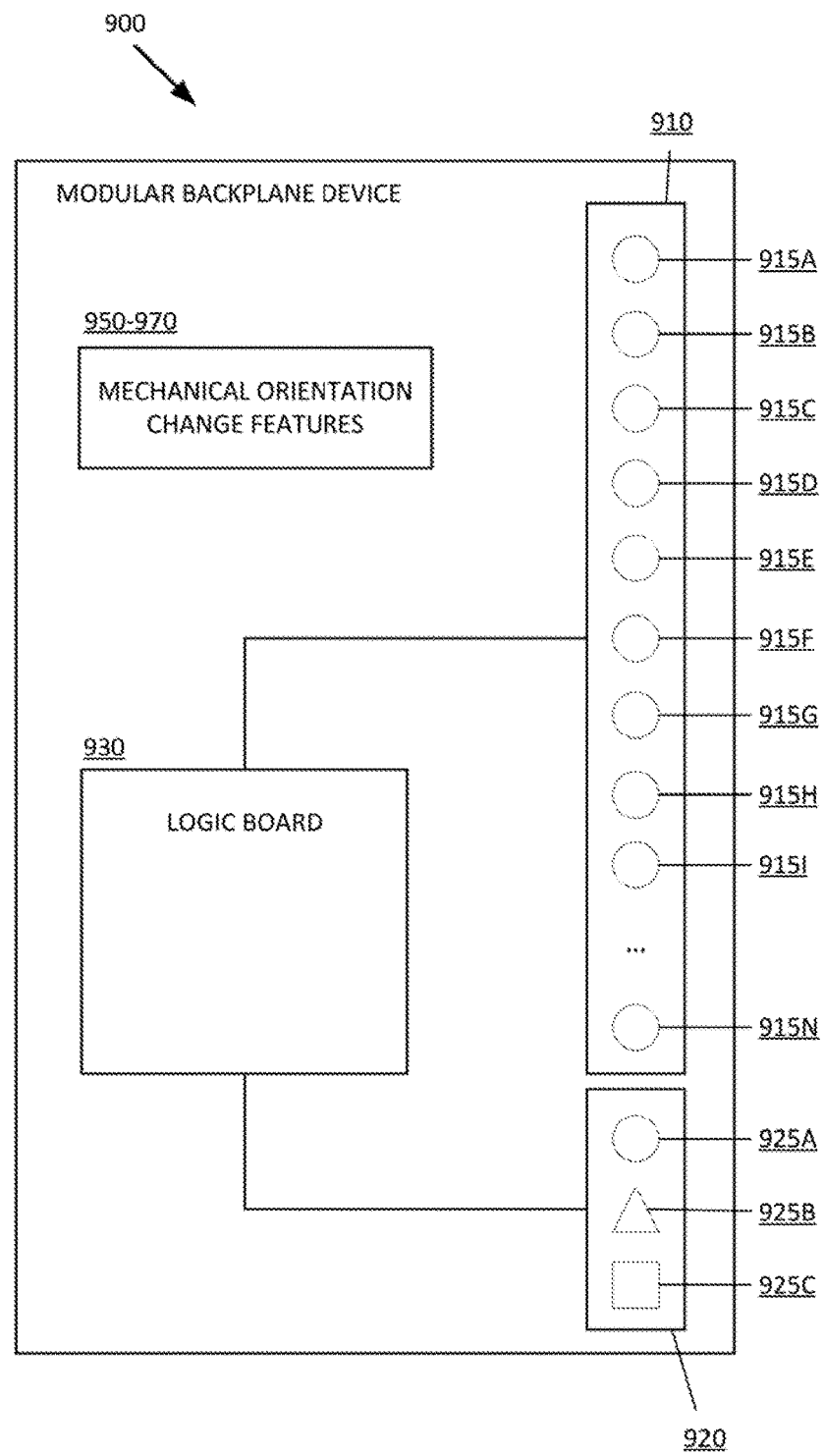
FIG. 9A is a block diagram illustrating a modular backplane device example for transforming signals via a logic board with mechanical orientation change features.

FIG. 9A illustrates a block diagram illustrating a modular backplane device 900 example for transforming signals via a logic board with mechanical orientation change features. The modular backplane device 900 comprises a first interface connector 915A, a second interface connector 915B, to a N interface connector 915N, wherein N is a positive integer; the N interface connectors are referred hereinafter as a plurality 910 of interface connectors. The plurality 910 of interface connectors may be similar or the same as the plurality 110 of interface connectors of FIG. 1. The system 900 example further comprises a first aggregation point connector 925A, a second aggregation point connector 925B, and a third aggregation point connector 925C; the collection of aggregation point connectors may be referred hereinafter as one or more aggregation point connectors 920. Even though the present example comprise three aggregation point connectors 925A-925C, the scope of the present disclosure may be understood broadly and may include from 1 to M aggregation point connectors, wherein M is a positive integer. The one or more aggregation point connectors 920 may be similar or the same as the one or more aggregation point connectors 120 of FIG. 1. The system 900 example includes a logic board 930. The logic board 930 may be similar or the same as the logic board 130 of FIG. 1. The modular backplane device 900 may further comprise mechanical orientation change features 950-970 to unlock, rotate and lock the module connectors. The mechanical orientation change features 950-970 may be used to change the modular backplane device 900 from a first physical orientation configuration to a second physical orientation configuration (e.g. first physical orientation configuration from FIG. 8B and second physical orientation configuration from FIG. 8C).

Figure 9B:
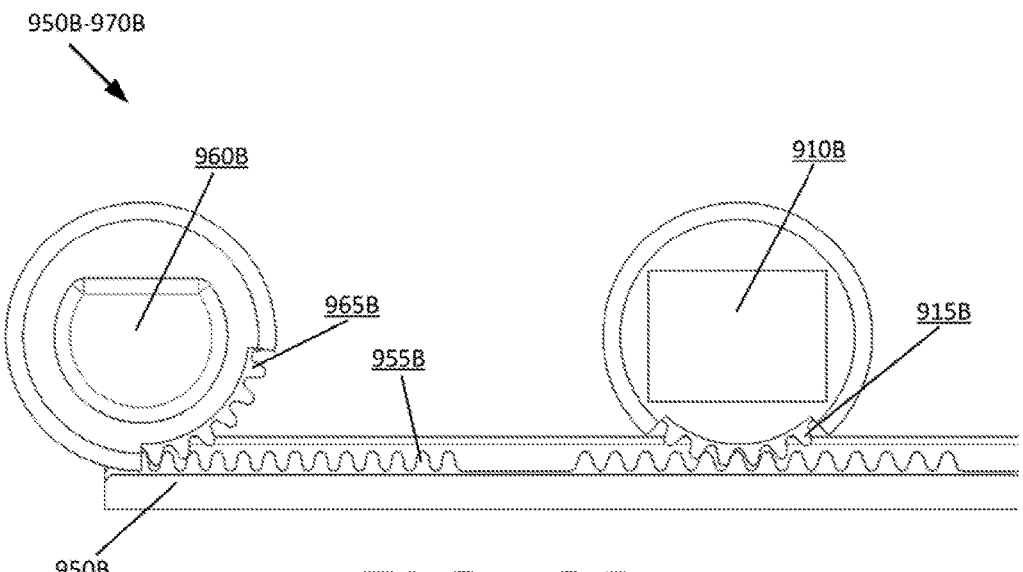
FIG. 9B is a schematic diagram example of a system with mechanical orientation change features.
Figure 9C:
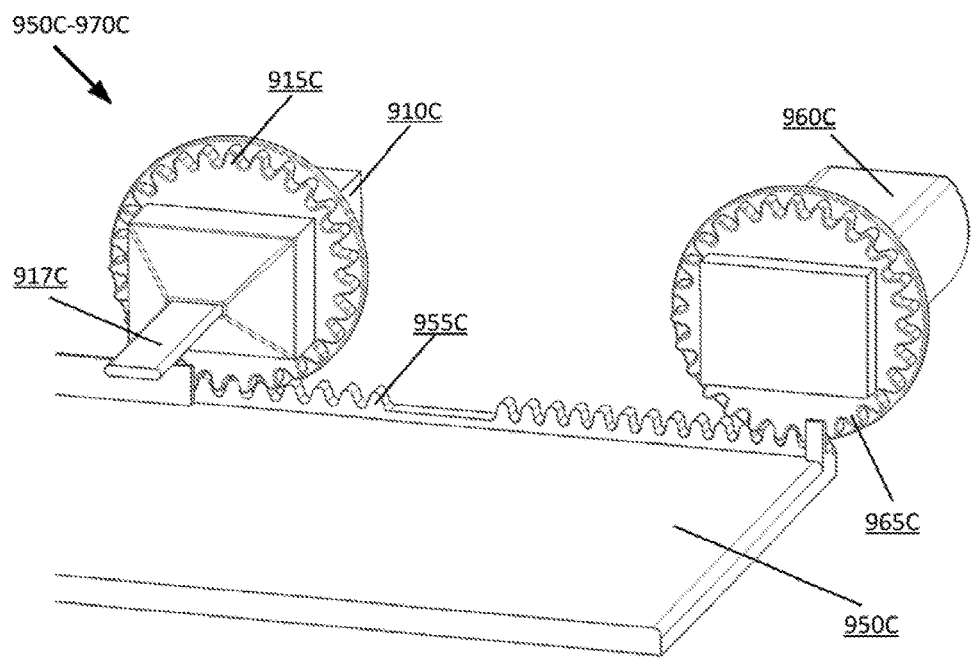
FIG. 9C is a schematic diagram example of a system with mechanical orientation change features.

Some examples of mechanical orientation change features 950-970 installed in the modular backplane device 900 may be slide buttons, slide gear track, connector gear, orientation indicator insignia and/or a rotation key feature. The slide buttons may be used to change the modular backplane device 900 from a first physical orientation to a second physical orientation. The slide buttons may be further activated to change the modular backplane device 900 from a second physical orientation to a first physical orientation. As a first example, a user may want to change the modular backplane from a first physical orientation to a second physical orientation. The user may move the slide button in a lateral direction, which may in turn move the slide gear track in the same lateral direction which, at the same time, may rotate all the connector gears within the modular backplane device 900 (FIG. 9B-9C illustrate in further detail the movement transmission from the slide gear track and the connector gears). Lateral movement may be understood as the movement along the axis of the elongated section of the modular backplane device.

The slide gear track may further orientate an indicator insignia to its first physical orientation configuration marking or to its second physical configuration marking. The orientation insignia markings may be used by the user to realize whether the modular backplane device 900 is configured in its first physical orientation configuration (e.g. first physical orientation configuration from FIG. 8B) or in its second physical orientation configuration (e.g. second physical orientation configuration from FIG. 8C). The slide gear track may further rotate the keying feature so that the keying feature may be allow the modular backplane device 900 to be aligned to the assembly.

Some examples of mechanical orientation change features 950-970 installed in the modular backplane device 900 are illustrated in FIG. 9B-9C.

FIG. 9B illustrates a schematic diagram example of a system 950B-970B with mechanical orientation change features. The system 950B-970B comprises an interface connector 910B, interface connector gears 915B, a slide gear track 950B, slide gear track gears 955B, a rotatable keying feature 960B, and rotatable keying feature gears 965B. Even though the example comprises one interface connector, the scope of the example may be understood broadly, and may include a plurality of interface connectors. The elements illustrated in FIG. 9B may be the same or similar to the elements of FIG. 5A-5C. The system 950B-970B may be part of the modular backplane device 100 of FIG. 1.

The interface connector gears 915B may be attached to the interface connector 910B in a way that the interface connector gears 915B and the interface connector 910B rotate on the same axis. The rotatable keying feature gears 965B may be attached to the rotatable keying feature 960B in a way that the rotatable keying feature gears 965B and the rotatable keying feature 960B rotate on the same axis. The interface connector gears 915B and the rotatable keying feature gears 965B may be circular gears, therefore, the plurality of teeth are set in a circular structure (e.g. interface connector 910B, rotatable keying feature 960B).

The slide gear track gears 955B may be attached to the surface of the slide gear track 950B in a way the slide gear track gears 955B and the slide gear track 950B slide in a translational movement together. The slide gear track gears 955B may comprise a plurality of teeth set in a plane surface structure (e.g. slide gear track 950B). A translational movement of the slide gear track 950B may be the result, for example, of a translational movement of a slide button (e.g. slide buttons 550A-550B from FIG. 5A) attached on the opposite surface with respect to the surface where the plurality of teeth set are. The slide gear track 950B may be attached to the inner housing of the modular backplane device 100 from FIG. 1.

The rotatable keying feature gears 965B may be meshed with the slide gear track gears 955B in a way that the translation movement from the slide gear track gears 955B transmits a rotatable movement to the rotatable keying feature gears 965B; and in a way that the rotation movement of the rotatable keying feature gears 965B transmits a translational movement to the slide gear track gears 955B. The interface connector gears 915B may be meshed with the slide gear track gears 955B in a way that the translation movement from the slide gear track gears 955B transmits a rotatable movement to the interface connector gears 915B; and in a way that the rotation movement of the interface connector gears 915B transmits a translational movement to the slide gear track gears 955B.

FIG. 9C illustrates a schematic diagram example of a system 950C-970C with mechanical orientation change features. The system 950C-970C comprises an interface connector 910C, interface connector gears 915C, an interface connector axis 917C, a slide gear track 950C, slide gear track gears 955C, a rotatable keying feature 960C, and rotatable keying feature gears 965C. Even though the example comprises one interface connector, the scope of the example may be understood broadly, and may include a plurality of interface connectors. The elements illustrated in FIG. 9C may be the same or similar to the elements of FIG. 5A-5C. The system 950C-970C may be part of the modular backplane device 100 of FIG. 1.

The interface connector gears 915C may be attached to the interface connector 910C in a way that the interface connector gears 915C and the interface connector 910C rotate on the same axis (e.g. interface connector axis 917C). The interface connector axis 917C is a fixed axis, in a way it allows the rotation of the interface connector gears 915C; but disables the movement across the perpendicular direction of the elongation of the slide gear track 950C. The rotatable keying feature gears 965C may be attached to the rotatable keying feature 960C in a way that the rotatable keying feature gears 965C and the rotatable keying feature 960C rotate on the same axis. The interface connector gears 915C and the rotatable keying feature gears 965C may be circular gears, therefore, the plurality of teeth are set in a circular structure (e.g. interface connector 910C, rotatable keying feature 960C).

The slide gear track gears 955C may be attached to the surface of the slide gear track 950C in a way the slide gear track gears 955C and the slide gear track 950C slide in a translational movement together. The slide gear track gears 955C may comprise a plurality of teeth set in a plane surface structure (e.g. slide gear track 950C). A translational movement of the slide gear track 950B may be the result, for example, of a translational movement of a slide button (e.g. slide buttons 550A-550B from FIG. 5A) attached on the opposite surface with respect to the surface where the plurality of teeth set are. The slide gear track 950C may be attached to the inner housing of the modular backplane device 100 from FIG. 1.

The rotatable keying feature gears 965C may be meshed with the slide gear track gears 955C in a way that the translation movement from the slide gear track gears 955C transmits a rotatable movement to the rotatable keying feature gears 965C; and in a way that the rotation movement of the rotatable keying feature gears 965C transmits a translational movement to the slide gear track gears 955C. The interface connector gears 915C may be meshed with the slide gear track gears 955C in a way that the translation movement from the slide gear track gears 955C transmits a rotatable movement to the interface connector gears 915C; and in a way that the rotation movement of the interface connector gears 915C transmits a translational movement to the slide gear track gears 955C.

Figure 10:
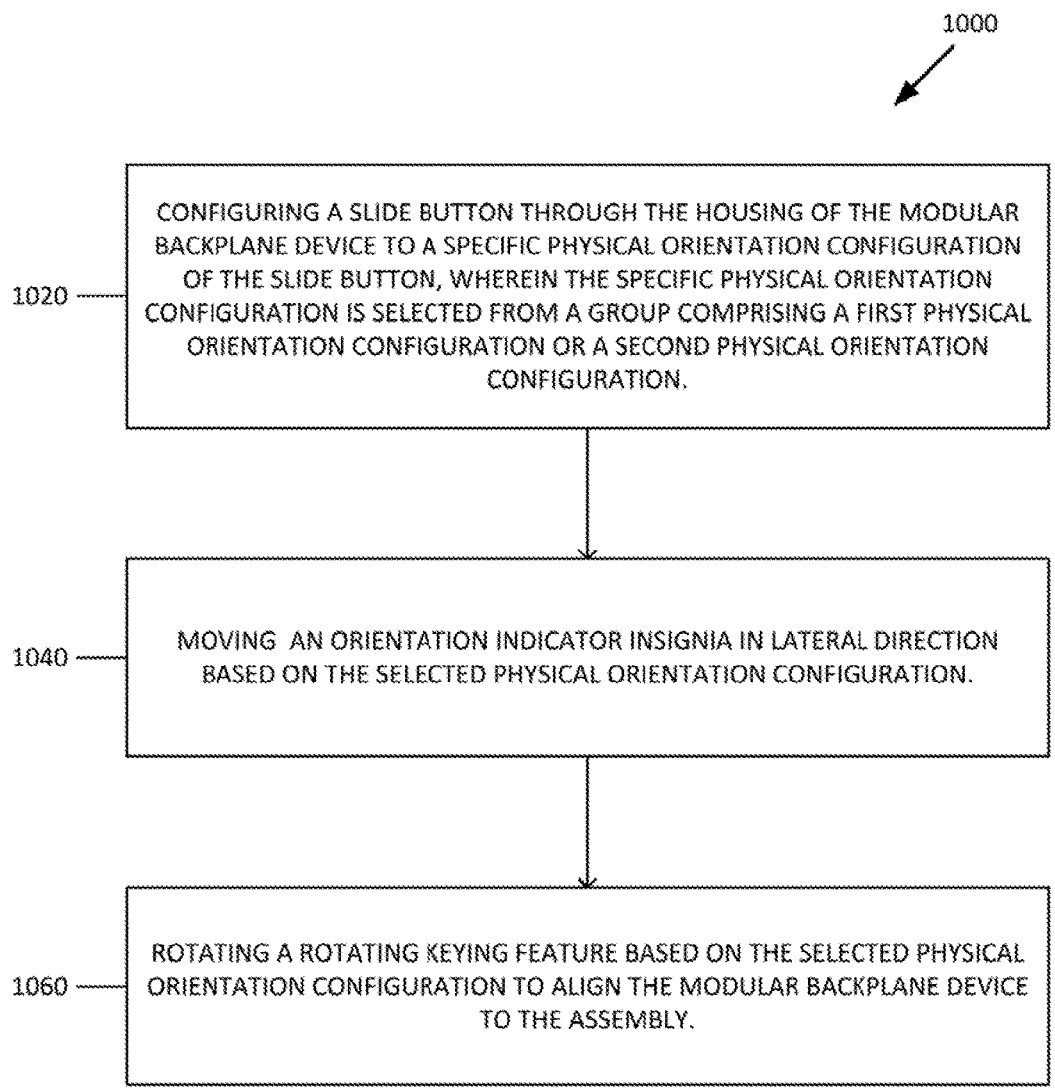
FIG. 10 is a flow chart of an example method to mechanical change features from a modular backplane device.

FIG. 10 illustrates a flow chart of a method 1000 example to mechanical change features from a modular backplane device. Method 1000 as well as the method described herein may be used, for example, by the modular backplane device 100 from FIG. 1. The components described hereinafter may be similar or the same as the components from FIG. 9A-9C.

At block 1020, the method 1000 configures a slide button through the housing of the modular backplane device to a specific physical orientation configuration of the slide button, wherein the specific physical orientation configuration is selected from a group comprising a first physical orientation configuration (e.g. first physical orientation configuration from FIG. 8B) or a second physical orientation configuration (e.g. second physical orientation configuration from FIG. 8C). Lateral movement of the slide button may cause a lateral movement of the slide gear track. The slide button may have a locking feature to lock itself when it is in a resting position, after it is laterally moved to be in a first physical orientation configuration or a second physical orientation configuration. A locked slide button may disable the lateral movement of the slide gear track, which in turns may disable the alteration of the physical orientation configuration. Lateral movement may be understood as both, the movement along the axis of the elongated section of the modular backplane device, and the movement perpendicular to the axis of the elongated section of the modular backplane device.

At block 1040, the method 1000 moves an orientation indicator insignia in lateral direction based on the selected physical orientation configuration. For example, the slide button from the housing of the modular backplane device is configured in its first physical orientation configuration, then the orientation indicator insignia is orientated in its first physical orientation configuration (e.g. markings indicating first physical orientation configuration). As another example, the slide button from the housing of the modular backplane device is configured in its second physical orientation configuration, then the orientation indicator insignia is orientated in its second physical orientation configuration (e.g. markings indicating second physical orientation configuration). The orientation insignia markings may be used by the user to realize whether the modular backplane device is configured in its first physical orientation configuration or in its second physical orientation configuration.

At block 1060, the method 1000 rotates a rotating keying feature to align the modular backplane device to the rest of the assembly based on the selected physical orientation configuration. The method 1000 may further rotate the rotating keying feature along with the interface connectors gears (e.g. interface connector gears 915B along with interface connector 910B from FIG. 9B).

The method 1000 may further comprise a step of attaching a plurality of retention screws to secure the housing of the modular backplane device to the assembly.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A modular backplane device, comprising:
   a housing;
   a plurality of interface connectors evenly distributed on a first side of the housing;
   one or more aggregation point connectors on an edge of the first side of the housing
   and
   a logic board coupled to the plurality of interface connectors and to the aggregation point connectors, the logic board comprising a management processor and a signal transformation device comprising an electrical/electrical signal transformation device, an electrical/optical signal transformation device, or an optical/optical signal transformation device,
   wherein the plurality of interface connectors are configured to transfer first data signals between the logic board and modules connected to the plurality of interface connectors,
   the aggregation point connectors are configured to transfer second data signals and management information between the logic board and a switch connected to the aggregation point, and to receive electrical power for the logic board, and
   the management processor and the signal transformation device are configured to perform signal transformation between the first and second data signals.

2. The modular backplane device of claim 1 wherein the plurality of interface connectors are identical.

3. The modular backplane device of claim 1 wherein the plurality of interface connectors are aligned with one another.

4. The modular backplane device of claim 3 wherein the housing is an elongated housing, wherein the plurality of interface connectors are installed along the length of the elongated housing.

5. The modular backplane device of claim 1 wherein the signal transformation device is an electrical/electrical signal transformation device, the first data signals are electrical signals, and the second data signals are electrical signals.

6. The modular backplane device of claim 1 further comprising:
   a plurality of sensing antennas, each associated with one of the plurality of interface connectors and configured to detect module information of a module connected to the corresponding interface connector, wherein the plurality of sensing antennas are connected to the logic board to convey detected module information to the logic board.

7. The modular backplane device of claim 1 further comprising an air vent.

8. The modular backplane device of claim 1, further comprising:
   mechanical orientation change features configured to change respective orientations of the plurality of interface connectors.

9. The modular backplane device of claim 8, wherein the mechanical orientation change features include: a slide gear track, and a connector gear for each of the plurality of interface connectors that is enmeshed with the slide gear track such that lateral movement of the slide gear track causes the plurality of interface connectors to rotate.

10. An assembly comprising:
    a first instance of the modular backplane device of claim 1 ("first backplane");
    first modules connected to the plurality of interface connectors of the first backplane; and
    a switch connected to at least one of the aggregation point connectors of the first backplane.

11. The assembly of claim 10, further comprising:
    a second instance of the modular backplane device of claim 1 ("second backplane"); and
    second modules connected to the plurality of interface connectors of the second backplane,
    wherein the switch is connected to at least one of the aggregation point connectors of the second backplane,
    the switch is located between the first modules and the second modules, and
    the first backplane and second backplane are oppositely oriented.

12. The assembly of claim 11, wherein the first modules and second modules include storage modules.

13. A method comprising:
    providing the modular backplane device of claim 1,
    connecting the plurality of interface connectors to a plurality of modules; and
    connecting at least one of the aggregation point connectors to a switch.

14. The method of claim 13 further comprising:
    using a slide button of mechanical orientation change features of the modular backplane device to select an orientation configuration for the modular backplane device from among a group comprising a first orientation configuration or a second orientation configuration, wherein the slide button is to, when slid:
    move an orientation indicator insignia; and
    rotate a rotating keying feature.

15. The method of claim 13 wherein the modules are selected from a group comprising servers, storage modules, memory modules, or a combination thereof.

16. The modular backplane device of claim 1 wherein the signal transformation device is an electrical/optical signal transformation device, the first data signals are electrical signals, and the second data signals are optical signals.

17. The modular backplane device of claim 1 wherein the signal transformation device is an electrical/optical signal transformation device, the first data signals are optical signals, and the second data signals are electrical signals.

18. The modular backplane device of claim 1 wherein the signal transformation device is an optical/optical signal transformation device, the first data signals are optical signals, and the second data signals are optical signals.

* * * * *